No. 684,236. Patented Oct. 8, 1901.
J. N. HEALD.
CENTER GRINDING ATTACHMENT FOR LATHES.
(Application filed Jan. 28, 1901.)

(No Model.)

Witnesses:
C. F. Wesson
M. E. Regan

Inventor.
J. N. Heald,
By
Southgate & Southgate
Attorneys.

THE NORRIS PETERS CO., PHOTO-LITHO., WASHINGTON, D. C.

UNITED STATES PATENT OFFICE.

JAMES N. HEALD, OF BARRE, MASSACHUSETTS.

CENTER-GRINDING ATTACHMENT FOR LATHES.

SPECIFICATION forming part of Letters Patent No. 684,236, dated October 8, 1901.

Application filed January 28, 1901. Serial No. 44,977. (No model.)

*To all whom it may concern:*

Be it known that I, JAMES N. HEALD, a citizen of the United States, residing at Barre, in the county of Worcester and State of Massachusetts, have invented a new and useful Center-Grinding Attachment for Lathes, of which the following is a specification.

This invention relates to an apparatus for pointing or grinding lathe-centers; and the especial object of this invention is to provide a strong, simple, and efficient center-grinding mechanism in which the parts are combined to act in a simple, direct, and convenient manner and in which the bearings of the grinding-arbor are arranged so as to prevent the same from wearing or grinding out on account of the entrance of emery-dust therein.

To these ends this invention consists of the apparatus for grinding lathe-centers and of the combinations of parts therein, as hereinafter described, and more particularly pointed out in the claims at the end of this specification.

Figure 1:
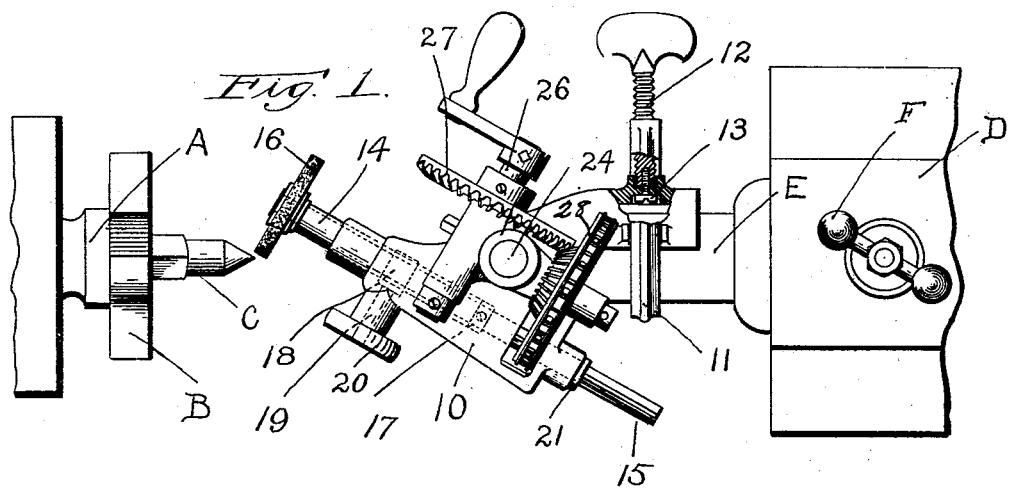
Figure 2:
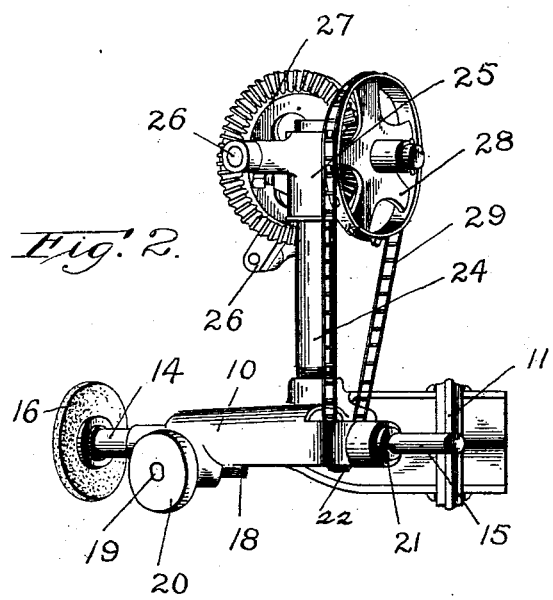
Figure 3:
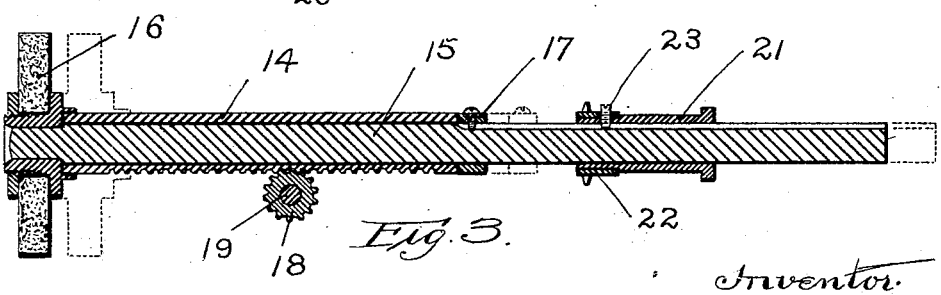

In the accompanying drawings, Figure 1 is a plan view of sufficient parts of a lathe to illustrate the application of my invention thereto. Fig. 2 is a side view of an apparatus for grinding lathe-centers constructed according to my invention; and Fig. 3 is an enlarged sectional view of the grinding-arbor, illustrating the way the same is preferably arranged in its bearings.

In order to produce accurate work upon any of the ordinary forms of metal-turning lathes in which the work is mounted and turns on centers, it is essential that the centers, especially the center employed in the head-stock of the lathe, should be of true conical form.

The especial object of my present invention is to provide a simple, convenient, and durable center-grinder for lathes and to arrange the parts so that emery dust or grit will not readily work its way into the bearings of the grinding-arbor.

To these ends an apparatus for grinding lathe-centers constructed according to my present invention comprises a supporting-frame having means for securing it to the tail-stock spindle of a lathe with a sleeve which is longitudinally movable in said frame; a grinding-arbor which is journaled and longitudinally movable with said sleeve, and means, preferably operated by hand, for rotating the grinding-arbor.

Referring to the accompanying drawings and in detail, A designates the head-stock spindle of a lathe, which carries a face-plate B and secured in which is a center C.

The tail-stock of the lathe is designated by the reference-letter D.

Longitudinally adjustable in the tail-stock D is a tail-stock spindle E, which may be clamped in its different adjusted positions by a handle F. These parts may be of any of the ordinary forms used in lathe construction and need not be herein described at length.

As herein illustrated, a grinding apparatus constructed according to this invention comprises a frame or support 10, which carries the working parts for grinding the head-stock center C of the lathe. The frame or support 10 is provided with a transversely-movable frame 11 for securing the device to the tail-stock spindle E. Threaded into the transverse frame 11 is a screw 12, which is fastened to the frame 10 by a small screw 13 in the end thereof, so that by means of this construction the parts are fastened together so that they cannot be detached or become separated from each other. Longitudinally movable in the frame 10 at the proper angle with respect to the center line of the lathe (usually an angle of thirty degrees) is a longitudinally-movable sleeve 14, and journaled in the longitudinally-movable sleeve 14 is a grinding-arbor or wheel-shaft 15. Secured on the arbor or grinding-shaft 15 in front of the sleeve 14 is a grinding-wheel 16, and secured on the shaft 15 at the rear of the sleeve 14 is a collar 17. By means of this construction it will be seen that the sleeve 14 forms a bearing or box in which the grinding-shaft will rotate or turn and that the grinding-shaft will not be moved longitudinally through its bearing in the sleeve 14, and I regard this as a feature of importance, as I have found in practice that if the grinding-arbor is journaled so as to rotate and move longitudinally in a bearing the grit or dust of emery will soon grind out or wear the bearing, causing the parts to work loose. The sleeve 14 is held from turning and may be moved back and forth by means of a pinion 18, carried by a shaft 19, having an adjusting-handle 20.

Splined onto the grinding arbor or shaft 15 is a driving-sleeve 21, which is journaled in fixed position in the frame of the machine and is provided with a driven sprocket 22, which is secured in place by a screw 23, which also acts as a key for connecting the shaft 15 and driving-sleeve 21. In this connection it is also to be noted that while the grinding-arbor is longitudinally movable through its driving-sleeve it is keyed thereto, so that a combined rotary and longitudinal movement, which I have found will wear out the bearings of a machine of this class, is also avoided in this connection—that is to say, in a machine constructed according to my invention the grinding-arbor rotates within but does not move longitudinally with respect to its adjusting-sleeve, while it is splined to and longitudinally adjustable with respect to its driving-sleeve, but does not rotate with respect thereto.

The driving connections which I employ for turning or rotating the grinding-arbor are preferably operated by hand and are arranged to work with comparatively little friction and impart a comparatively high speed to the grinding-arbor.

As herein shown, a pipe or tube extends up from the main frame of the machine, and adjustably clamped onto the pipe 24 is a slide or bearing-piece 25. Journaled in the bearing-piece 25 is a crank-actuated driving-shaft 26, carrying a bevel-gear 27, which meshes with and drives a bevel-pinion which is carried by or formed integrally with a driving-sprocket 28. The driving-sprocket 28 is connected to the driven sprocket 22 by a driving-chain 29, which is left loose enough to work with comparatively little friction, so that the driving-shaft may be turned from the grinding-arbor at a comparatively high speed with less resistance than if a train of connected gearing was employed for this purpose. The tension of the driving-chain 29 can be adjusted or regulated by adjusting the bearing-piece 25 upon its pipe 24.

In the use of a grinding apparatus as thus constructed the grinding-wheel will be moved up into engagement with the center carried by the head-stock spindle of the lathe, so that during the rotation of the head-stock spindle of the lathe by turning the driving-handle of the apparatus and moving the longitudinally-adjustable sleeve back and forth by means of the handle 20 the head-stock center will be accurately ground or trued. In the use of this construction it is also to be observed that inasmuch as the grinding-arbor is located in the same horizontal plane with the center line of the lathe the center will be ground or pointed at an angle of thirty degrees independently of whether the tail-stock spindle of the lathe has been set over or whether the same occupies exactly its central position.

I am aware that numerous changes may be made in the construction of my apparatus for grinding lathe-centers by those who are skilled in the art without departing from the scope of my invention as expressed in the claims. I do not wish, therefore, to be limited to the construction which I have herein shown and described; but What I do claim, and desire to secure by Letters Patent of the United States, is—

1. In an apparatus for grinding lathe-centers, the combination of a grinding-arbor, a supporting-frame, and means for mounting the grinding-arbor in the supporting-frame so that it may move longitudinally without having both a sliding and rotating motion in either of its bearings, comprising a longitudinally-movable sleeve in which the grinding-arbor is journaled, but does not move longitudinally, and a driven sleeve journaled in fixed position in the frame through which the grinding-arbor moves longitudinally, but to which the same is keyed or splined so as to turn therewith, substantially as described.

2. In an apparatus for grinding lathe-centers, the combination of a grinding-arbor, a frame, means for mounting the grinding-arbor in the frame so that it will not have both a sliding and rotary motion in either of its bearings, comprising a longitudinally-movable sleeve in which the grinding-arbor is journaled, but through which the same does not move longitudinally, a driving-sleeve journaled in fixed position in the frame, and through which the grinding-arbor moves longitudinally, but to which the same is keyed or splined so as to turn therewith, and hand-operated driving connections comprising a pair of bevel-gears and a sprocket-chain for turning the driving-sleeve from said bevel-gears, substantially as described.

3. In an apparatus for grinding lathe-centers, the combination of a longitudinally-movable grinding-arbor, a frame in which said grinding-arbor is mounted, means for feeding or moving said grinding-arbor longitudinally, and hand-operated connections for turning the grinding-arbor, comprising an upright pipe or support, a bearing-piece adjustable thereon, a crank-operated gear meshing with and driving a gear carrying a sprocket-wheel, a driving-sleeve having a sprocket wheel or gear thereon, and a sprocket-chain connecting the sprocket-wheels, said parts being arranged so that the tension of the sprocket-chain can be adjusted by setting the vertically-movable bearing-piece, substantially as described.

4. In an apparatus for grinding lathe-centers, the combination of a longitudinally-movable grinding-arbor, a frame in which said grinding-arbor is mounted, means for moving the grinding-arbor longitudinally, hand-operated connections for turning said grinding-arbor, and means for clamping the frame onto the tail-stock spindle of a lathe, comprising a socket-section for engaging one side of the tail-stock spindle, a transversely-movable clamping-frame, and a screw threaded into the clamping-frame for holding said parts in place, said screw being pivoted to the frame and connected therewith so that the parts will be secured together, substantially as described.

5. In an apparatus for grinding lathe-centers, the combination of a frame, a screw permanently secured in said frame, a transversely-movable frame or yoke threaded onto said screw to secure the frame to the tail-stock spindle of a lathe, a longitudinally-movable sleeve mounted in said frame, a transverse shaft and pinion for adjusting said sleeve, a grinding-arbor journaled in and longitudinally movable with said sleeve, a driven sleeve journaled in fixed position in the frame and keyed onto the grinding-arbor, a vertical pipe extending up from the frame, a bearing-piece adjustably mounted on the pipe, and a pair of hand-operated bevel-gears mounted in the bearing-piece, and having a chain-and-sprocket connection with the driven sleeve, substantially as described.

In testimony whereof I have hereunto set my hand in the presence of two subscribing witnesses.

JAMES N. HEALD.

Witnesses:
HENRY J. WOLCOTT, Jr.,
JOHN C. BARTHOLOMEW.